United States Patent [19]
Yokoyama

[11] Patent Number: 5,654,908
[45] Date of Patent: Aug. 5, 1997

[54] ELECTRONIC DIARY WITH NAVIGATION DESTINATION OUTPUT

[75] Inventor: Shoji Yokoyama, Aichi-pref., Japan

[73] Assignees: Kabushikikaisha Equos Research; Kabushikiaisha Shinsangyokaihatsu, both of Japan

[21] Appl. No.: 375,791

[22] Filed: Jan. 20, 1995

[30] Foreign Application Priority Data

May 16, 1994 [JP] Japan .................................. 6-125812

[51] Int. Cl.⁶ .................................................. G06F 17/00
[52] U.S. Cl. ........................... 364/705.05; 364/444.1
[58] Field of Search ............................... 364/444, 449, 364/424.04, 705.05, 705.06; 340/995; 345/173, 179; 342/357, 457

[56] References Cited

U.S. PATENT DOCUMENTS

| | | | |
|---|---|---|---|
| Re. 32,655 | 4/1988 | Levine | 368/29 |
| 4,857,716 | 8/1989 | Gombrich et al. | 235/462 |
| 5,199,104 | 3/1993 | Hirayama | 395/145 |
| 5,243,529 | 9/1993 | Kashiwazaki | 364/449 |
| 5,365,449 | 11/1994 | Kashiwazaki | 364/449 |
| 5,440,559 | 8/1995 | Gaskill | 370/95.1 |
| 5,544,061 | 8/1996 | Morimoto et al. | 354/444 |

FOREIGN PATENT DOCUMENTS

| | | |
|---|---|---|
| 0632252 | 1/1995 | European Pat. Off. . |
| 2171911 | 7/1990 | Japan . |
| 2187898 | 7/1990 | Japan . |
| 3166844 | 7/1991 | Japan . |
| 3225550 | 10/1991 | Japan . |
| 6331366 | 12/1994 | Japan . |

*Primary Examiner*—Michael Zanelli
*Attorney, Agent, or Firm*—Lorusso & Loud

[57] ABSTRACT

An electronic diary stores information for a schedule of a user, information of a business card binder, a telephone director and an address book into a schedule supervision table, a telephone number supervision table, an address supervision table and a business card supervision table. When the user specifies an item in the schedule as a destination, for example a visiting company, the electronic diary retrieves the address or the telephone number of the visiting company and transmits them as destination data to a navigation apparatus. The navigation apparatus sets up the destination based on the received destination data.

17 Claims, 9 Drawing Sheets

RAM — 203

- TELEPHONE NUMBER SUPERVISION TABLE — 30
- ADDRESS SUPERVISION TABLE — 31
- BUSINESS CARD SUPERVISION TABLE — 32
- SCHEDULE SUPERVISION TABLE — 33
- REMAINING DATA STORE AREA — 34
- DESTINATION DATA STORE AREA — 35

FIG. 4

ELECTRONIC DIARY WITH NAVIGATION DESTINATION OUTPUT

TECHNICAL FIELD OF THE INVENTION

The present invention relates to an electronic diary, and more particularly relates to an electronic organizer or diary which sets up destinations for mobile navigation apparatus.

BACKGROUND OF THE INVENTION

Nowadays, conventional pocket notebooks which use paper are commonly being replaced by electronic diaries which convert various kinds of information into electronic data for storage or processing purposes. Electronic diaries are used as business card binders, telephone directories or address books, by storing various data in memory. The electronic diary can be used for managing the user's schedule by inputting his schedule. In the case where the electronic diary is provided with a telecommunication function, it can exchange data with a word processor, for example.

Mobile navigation apparatus is utilized for guiding a motor vehicle driver who is in an unfamiliar area to his destination. In use, the first process is a setting-up process which establishes the destination and starting point, and the second is a route searching process for establishing the route between two points which is to be followed by the motor vehicle and is carried out before the navigation apparatus guides the driver along the route.

In the setting-up process, the navigation apparatus retrieves the destination data, for example the coordinates of the destination or of intersections near the destination, and stores the destination data in the memory. Input of the destinations or the like is carried out by the driver through an input device such as a touch-panel mounted in the motor vehicle. For example, the input data may be the place name of the destination or a telephone number of the destination, or a selection from a list of destinations which may be district names, town names, or the like, sequentially displayed in windows style. In a particular navigation apparatus, GPS (global positioning system) is used for obtaining the present position which is then utilized as the starting point.

In the route searching process, the navigation apparatus establishes the route between the starting point and the destination, identified by the starting point data and destination data as input in the setting-up process, by using map data and road data including intersection data stored in a database, and stores the thus-established route.

In order to guide the driver along the route, the navigation apparatus sequentially displays the route and arrows showing the direction of travel of the motor vehicle towards the destination on a road map in accordance with the established route.

In conventional navigation apparatus, the above mentioned setting-up and course searching processes are commenced after a driver gets into the motor vehicle, since input of the destination in the setting-up process is carried out through the input device mounted in the motor vehicle after the driver or a passenger gets into the motor vehicle. Both processes require a certain time, thus, the driver cannot start the motor vehicle immediately after he gets into it.

Further, the input of the starting point in the setting-up process is also done through the input device positioned in the motor vehicle and, accordingly, a long input time is required overall.

SUMMARY OF THE INVENTION

An object of the present invention is to provide an electronic diary which enables navigation apparatus efficiently to complete a setting-up process and a route searching process requiring a starting point for route guidance and which can initiate the route guidance immediately after the driver gets into the motor vehicle.

Another object of the present invention is to provide an electronic diary which retrieves individual information relating to a destination from various kinds of individual stored information and enables navigation apparatus to use the retrieved destination information in the case where a user is following a schedule.

According to the present invention, an electronic diary comprises: an input device for inputting a schedule including a destination; means for storing the input schedule information; means for storing the names of individual destinations as a group and at least one of an address and a telephone number for each name; means for retrieval of a selected individual destination included in said schedule from said individual destinations storage means; and an output device for transmitting the retrieved individual destination as destination data for navigation apparatus.

Preferably, an electronic diary according to the invention comprises: a display for displaying information images and for input of a schedule including a destination; control means for controlling the input from the display and information images forming the display; a schedule information storage means for storing the schedule information input through the display; individual information storage means for storing the names of individual destinations as a group and at least one of an address and a telephone number for each of said names; individual information retrieval means for selectively retrieving individual information corresponding to a destination identified in said schedule information from said individual information storage means; and destination output means for transmitting the individual information retrieved by the individual information retrieval means as the destination data for navigation apparatus.

The invention also includes a method for providing information in an electronic diary for transmission to navigation apparatus, the method comprising the steps of: inputting a schedule including a destination; storing the input information; storing the names of individual destinations as a group and at least one of an address and a telephone number for each name as individual information; retrieving said individual information corresponding to the destination included in said schedule information; and outputting the retrieved individual information as destination data for a navigation apparatus.

The schedule information input from the input device is stored in the schedule information storage means. The individual information retrieval means retrieves the individual information corresponding to the destination included in the schedule information. The destination output means thus transmits the retrieved individual information as the destination data for the navigation apparatus.

BRIEF DESCRIPTION OF THE DRAWINGS

Embodiments of the invention will now be described by way of example with reference to the accompanying drawings, in which:

FIG. 4 is a schematic view showing data stored in the RAM of the electronic diary;

DETAILED DESCRIPTION OF THE PREFERRED EMBODIMENTS

Figure 1:
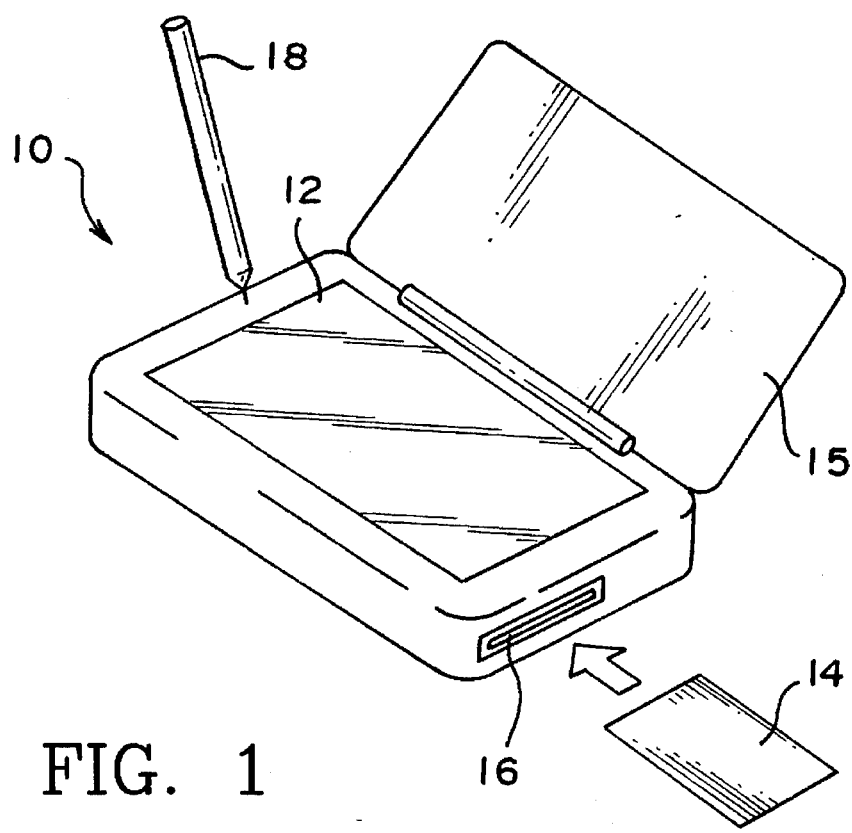
FIG. 1 is a perspective view showing an electronic diary embodying the invention.

Referring to FIG. 1, the electronic diary is shown generally at 10; the diary 10 can be held in the hand and comprises a display screen 12 for showing various kinds of image information such as characters and figures, a card slot for inserting an IC (integrated circuit) card 14, a power switch and various input keys (not shown). The display screen 12 may comprise a touch panel and information may be input with an input pen 18.

The electronic diary 10 not only has the function of an existing electronic diary but also a telecommunication function which is utilized when the diary is used for setting up a destination for navigation apparatus. Hereinafter, the navigation apparatus is the machine for guiding a motor vehicle driver who is unfamiliar in a particular area along a route to a destination.

Figure 2:
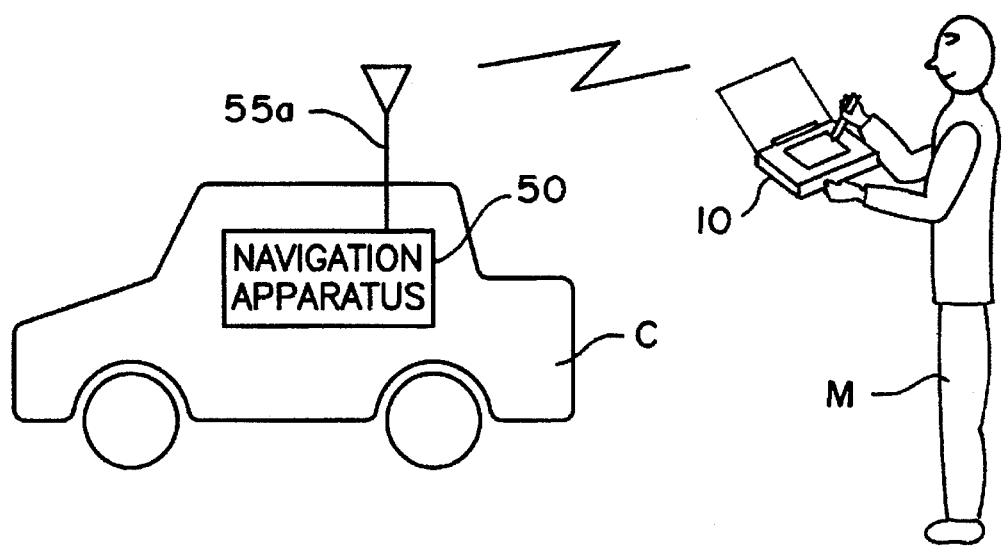
FIG. 2 is a schematic view showing the relationship between the electronic diary and mobile navigation apparatus.

FIG. 2 shows the relationship between the electronic diary 10 and navigation apparatus 50. As shown in the drawing, navigation apparatus 50 is mounted in a motor vehicle C, and can receive external data via an antenna 55a.

The electronic diary 10 transmits the data which specifies a selected destination, for example an address or a telephone number (hereinafter referred as destination data) to navigation apparatus 50 via radio waves or the like, when a user M selects the desired destination. Having received the destination data, navigation apparatus 50 establishes the intended route to the destination, ready for guiding the user M along the route when user M gets into the motor vehicle.

Figure 3:
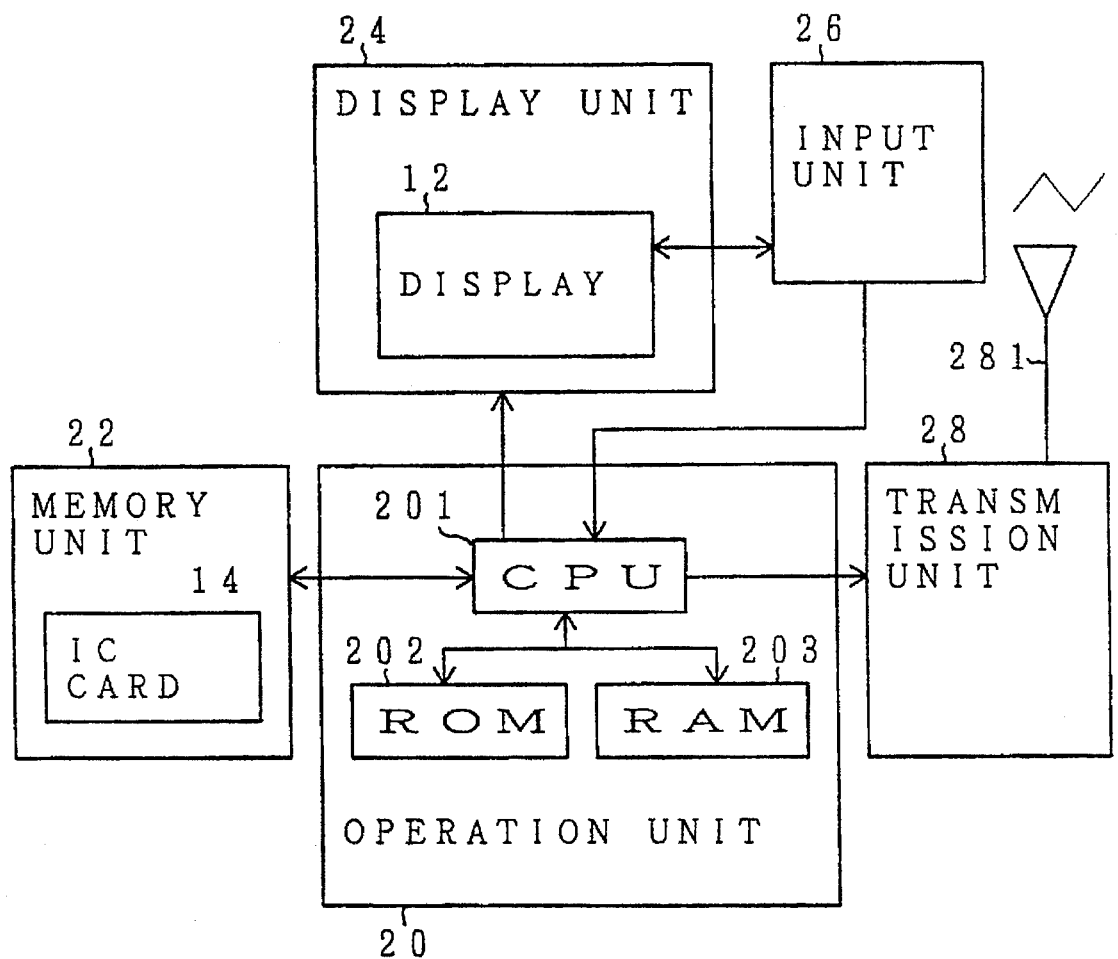
FIG. 3 is a block diagram showing the parts of the electronic diary of FIG. 1.

FIG. 3 schematically shows the configuration of electronic diary 10, which consists of an operation unit 20 for performing various processes, a memory unit 22 connected to operation unit 20, a display unit 24, an input unit 26 and a transmission unit 28.

Memory unit 22 reads and writes data to/from an IC (integrated circuit) card 14 as a memory medium. A magnetic disk, an optical disk or an optical magnetic disk may also be used as the memory medium.

Display unit 24 sends many kinds of character information and image information to a display screen 12 in accordance with the process performed by operation unit 20. Display screen 12 consists of a liquid crystal display screen or a plasma display screen.

Input unit 26 is utilized to select a process mode of operation unit 20 or to input hand-written characters or figures by touching a command displayed on display screen 12 with input pen 18. Alternatively, switches can be used to input unit 26. Input unit 26 has, not shown, input terminals and may receive external data, for example data from a keyboard or an OCR (optical character reader).

Operation unit 20 includes CPU (central processing unit) 201, ROM (read only memory) 202 for storing various programs and data, and RAM (random access memory) 203 as a working memory. ROM 202 stores operational programs and data of, for example, a Chinese character dictionary, a Japanese-English dictionary and an English-Japanese dictionary.

FIG. 4 shows each of the store areas in RAM 203. RAM 203 has a telephone number supervision table 30 for storing telephone numbers, an address supervision table 31 for storing addresses, a business card supervision table 32 for storing contents of business cards such as company names or divisions thereof, locations, telephone numbers and the like. Telephone number supervision table 30 can store the address data together with the telephone numbers, and address supervision table 31 can store telephone number data together with the addresses.

RAM 203 also has a schedule supervision table 33 for storing schedules input from input unit 26, a remaining data store area 34 for storing hand-written memos or compositions by way of input unit 26 and a destination data store area 35 for storing the destination data. The above data in RAM 203 can be written on IC card 14 or in memory unit 22 as required.

CPU 201 changes the process modes to operate the corresponding process according to a mode selection of the user. The process modes includes, for example, a schedule supervision mode for inputting and confirming the schedule, a telephone number supervision mode for inputting and confirming telephone numbers, addresses and contents of business cards, an address supervision mode, and a business card supervision mode.

CPU 201 retrieves the address or telephone number data as the destination data corresponding to an item of each schedule from each supervision mode. Further, CPU 201 recognizes hand-written characters input via display 12 with input pen 18, and retrieves the dictionary data and data of each supervision table, classifies the data in RAM 203, and converts the characters input via input unit 26, for example from Japanese characters to Chinese characters.

Transmission unit 28 transmits the destination data retrieved by operation unit 20 to navigation apparatus 50 via an antenna 281. Antenna 281 is installed in the body of electronic diary 10. The antenna may be installed in the cover 15 of electronic diary 10, or a telescopic aerial can be attached to the electronic diary 10. The diary is transmitted via FM or AM radio waves, a mobile telecommunication network, or infra-red rays. In the case where radio waves are utilized, the data can be transmitted a long distance from the motor vehicle. In the case of a mobile telecommunication network, the data may be transmitted via a portable telephone. When infrared rays are used, the data can be transmitted within the motor vehicle.

Figure 5:
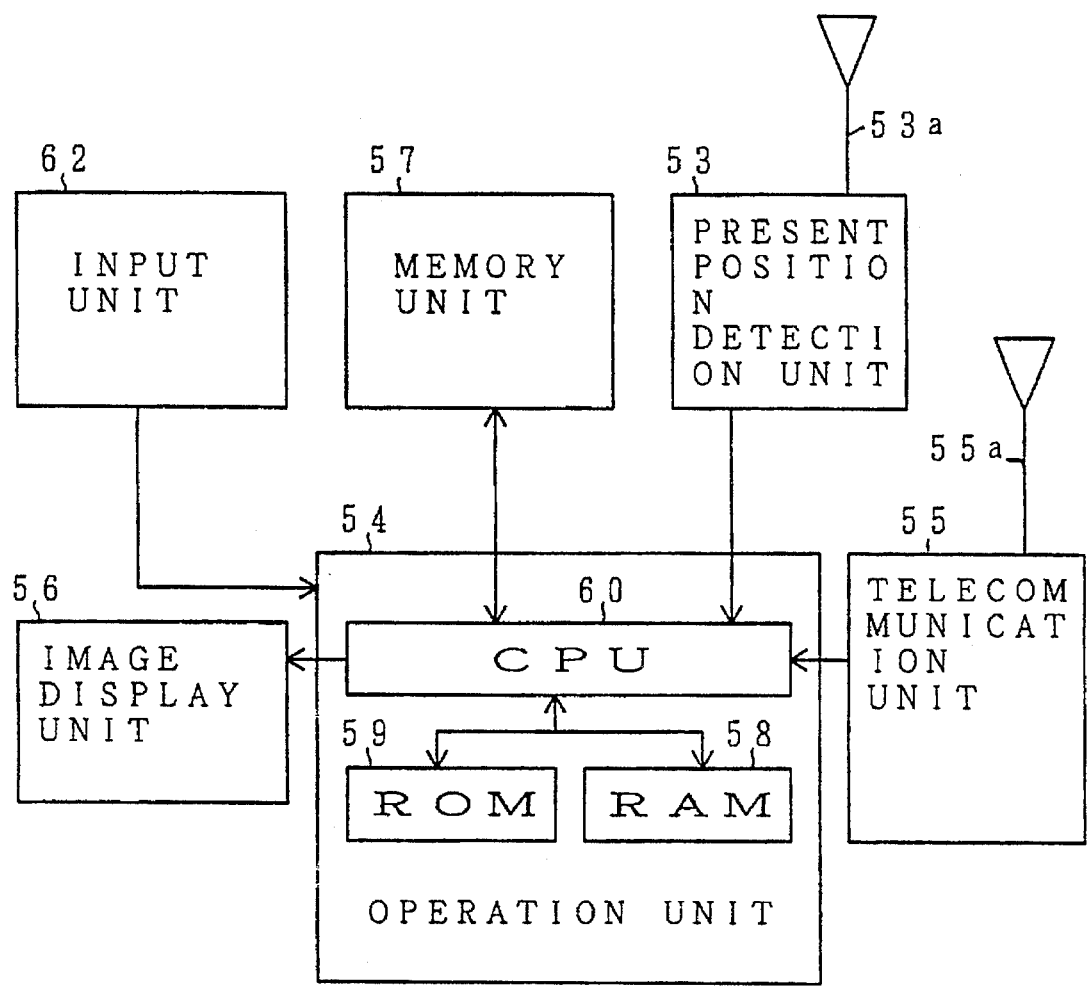
FIG. 5 is a block diagram showing navigation apparatus for use with an electronic diary according to the present invention.

FIG. 5 is a block diagram of navigation apparatus 50 for use with the present invention. The navigation apparatus includes an operation unit 54 for setting the destination and retrieving and guiding the route. The operation unit 54 is connected to a present position detection unit 53, a telecommunications unit 55, an image display unit 56, a memory unit 57, and an input unit 62 via interfaces (not shown). Input unit 62 is utilized when the destinations or the like are input without using the electronic diary 10.

The telecommunications unit 55 receives a starting signal and a destination signal to feed operation unit 54.

The memory unit 57 consists of a CD (compact disk)-ROM or an IC card. The memory unit 57 stores various destination set-up data consisting of coordinates of the destinations and intersections near the destinations, and road information such as map data and road data for searching the routes.

The present position detection unit 53 has a receiver (not shown) for receiving radio waves from GPS satellites or beacons positioned on roads, a mobile velocity sensor, and a wheel sensor. The detection unit 53 determines the present location of the motor vehicle (co-ordinates of latitude and longitude) by using the GPS receiver and combines the determined location with mileage and direction data obtained from each sensor to obtain an accurate position.

The operation apparatus 54 includes a CPU 60, and a ROM 58 and a RAM 59 connected to CPU 60 via a bus line or a data line.

The operation unit 54 performs the various processes, for example calculating the route and deciding the direction of travel, which are required to follow the routes, based on the destination data received by telecommunications unit 55, and data from memory unit 57 and present position detection unit 53. The operation unit 54 or CPU 60 supervises whether telecommunications unit 55 receives the starting signal from an external device. CPU 50 starts each unit when the signal is received.

ROM 59 stores various programs for the above processes of CPU 60 and RAM 58 performs as a working memory of CPU 60.

The image display unit 56 consists of a CRT (cathode ray tube) display, a liquid crystal display or the like, and displays many kinds of information to enable the route to be followed. For example, the image display unit 56 displays an edited map based on the map data sent from memory unit 57 through CPU 60, in which map the present position, the routes and an arrow showing the direction of travel, calculated by CPU 60, are displayed.

The operations of this embodiment will now be described.

The electronic diary 10 retrieves the telephone number or the address corresponding to each item of the schedule as the destination data from the telephone number supervision table 30 or address supervision table 31 to transmit to navigation apparatus 50 under the schedule supervision mode. The retrieving and transmitting of the destination data will now be described.

(1) SUMMARY OF THE OPERATION

Figure 6A:
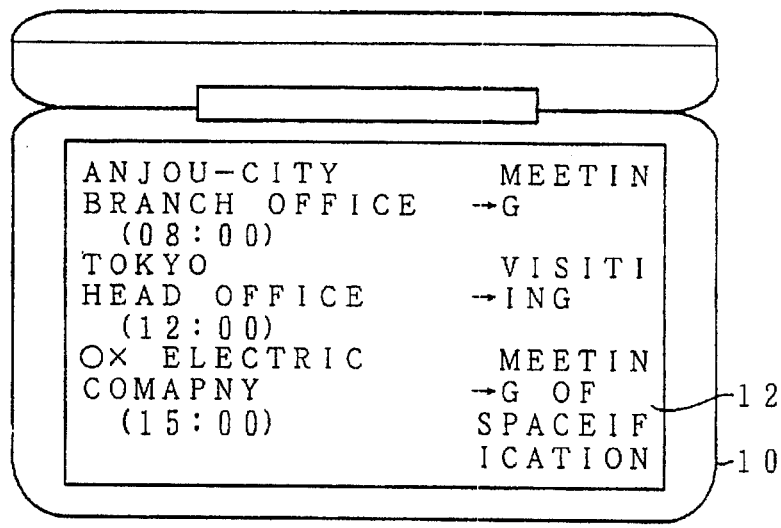
FIGS. 6(A), 6(B) and 6(C) are schematic illustrations showing examples of images of a display of the electronic diary.
Figure 6B:
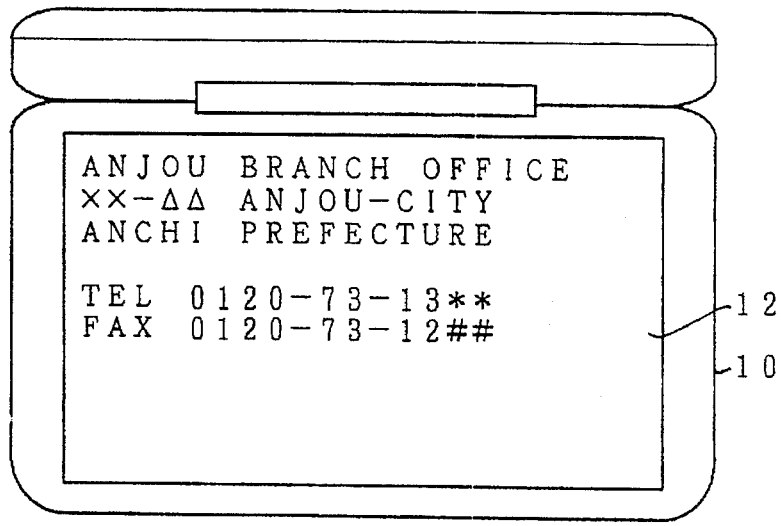

FIGS. 6(A) and 6(B) show images displayed on the display screen 12 under the schedule supervision mode.

The electronic diary 10 changes to the schedule supervision mode on input of a predetermined command with input pen 18 by the user, and for example displays a calendar on the screen. When the user indicates tomorrow's date by touching the calendar with input pen 18, the schedule for tomorrow, which was entered several days previously, is displayed on the display screen 12 as shown in FIG. 6(A).

The user selects a name of a destination group such as a company to be visited, which is to be transmitted to navigation apparatus 50 as a destination, from the items in the displayed schedule. For example, he selects Anjou-City branch office by touching 'ANJOU CITY BRANCH OFFICE' with input pen 18. The electronic diary 10 retrieves the destination data, that is, the location and the telephone number of the Anjou-City branch office, to display on display screen 12 as shown in FIG. 6(B).

Figure 6C:
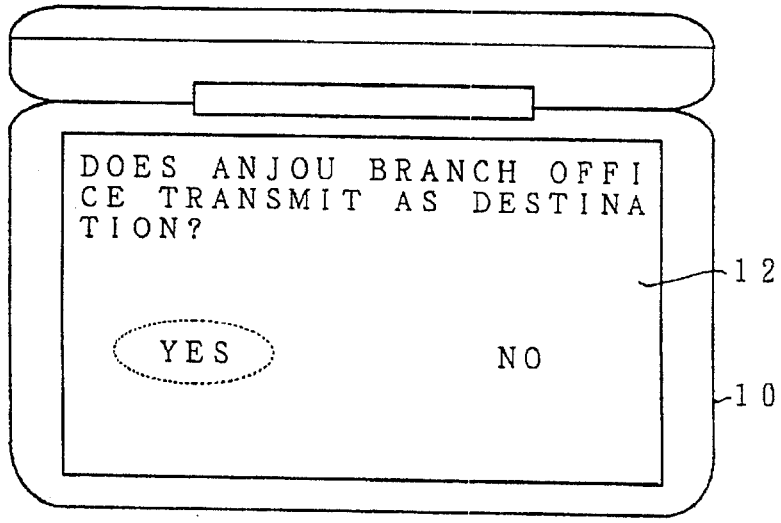

The electronic diary 10 displays a message, FIG. 6(C), on display screen 12 inquiring whether the retrieved destination data is to be transmitted to the navigation apparatus. If the user touches 'YES' on the screen with input pen 18 to confirm the transmission, the retrieved destination data is transmitted to navigation apparatus 50.

It should be noted, in this embodiment, that when both the address and the telephone number are retrieved, the address data is transmitted as the destination data. If only the telephone number is obtained as the result of the retrieval, the telephone number data is transmitted as the destination data.

The navigation apparatus obtains corresponding coordinates (latitude and longitude) based on the destination data consisting of the address data, or retrieves the location data from the destination data consisting of the telephone number data to obtain the coordinates. The navigation apparatus 50 then sets up the co-ordinates as the destination and establishes the intended route to the destination.

(2) DETAILED DESCRIPTION OF THE OPERATION

Figure 7:
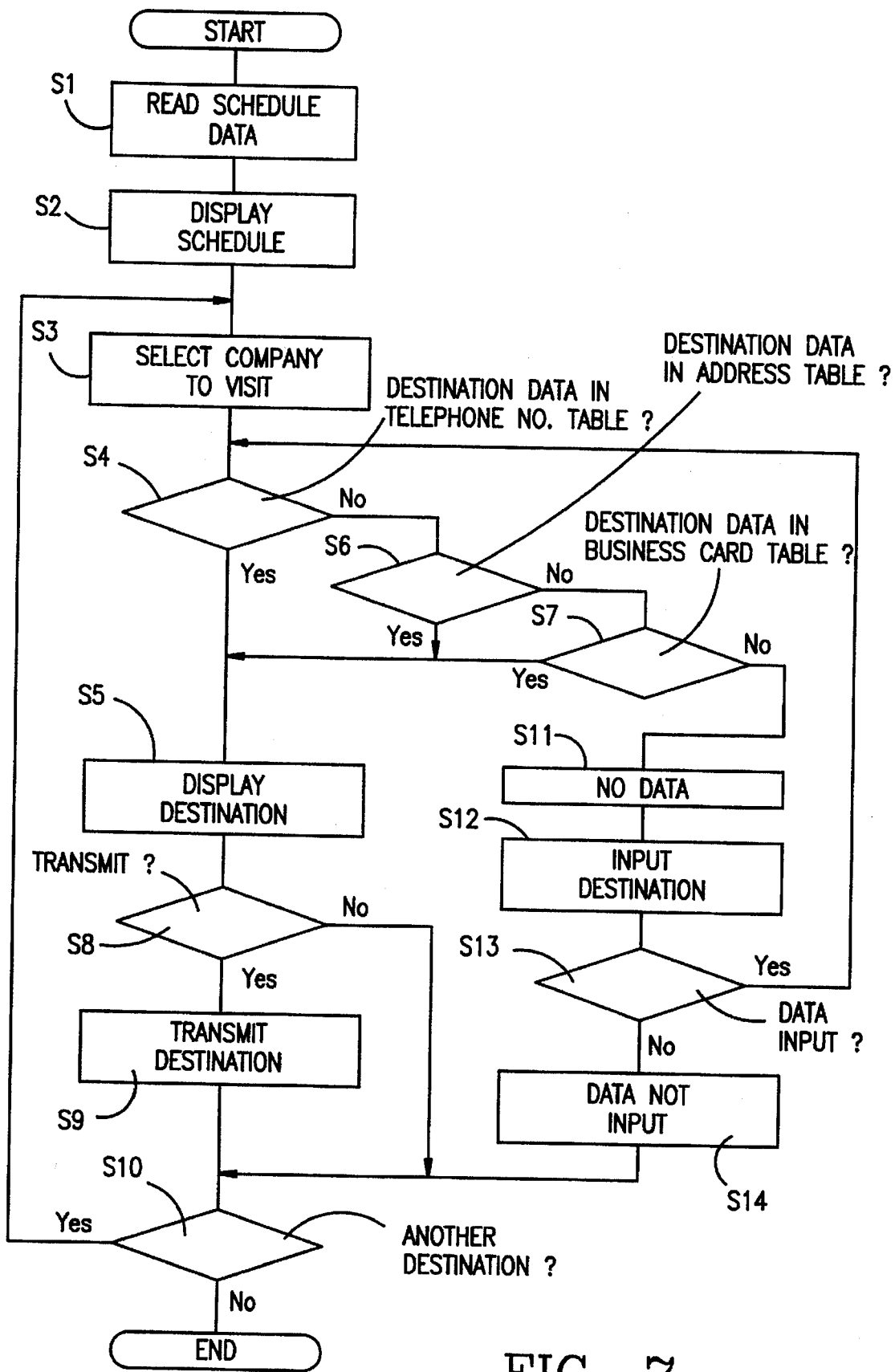
FIG. 7 is a flow sheet showing operational processes of the electronic diary in one operational mode.

FIG. 7 shows the sequence of operation of electronic diary 10.

When the schedule supervision mode is selected (step 1) and the required data is identified, operation unit 20 reads the schedule of the identified data from schedule supervision table 33 in RAM 203, and displays the image on display screen 12 as shown in FIG. 6(A) (step 2).

When the company to be visited in the displayed schedule is selected by the user (step 3), operation unit 20 retrieves the corresponding destination data from telephone number supervision table 30 in RAM 203 (step 4: DOES DESTINATION DATA EXIST IN TELEPHONE NUMBER SUPERVISION TABLE?). As a result of the retrieval, if the destination data exists in telephone number supervision table 30 (step 4; Yes), the destination data is displayed on display screen 12 as shown in FIG. 6(B) and is stored in destination store area 35 (step 5).

Alternatively, if the destination data does not exist (step 4; No), address supervision table 31 is retrieved (step 6: DOES DESTINATION DATA EXIST IN ADDRESS SUPERVISION TABLE?). If the corresponding destination data exists (step 6; Yes), the operation proceeds to step 5. If the corresponding destination data does not exist (step 6; No), business card supervision table 32 is retrieved (step 7 : DOES DESTINATION DATA EXIST IN BUSINESS CARD SUPERVISION TABLE?). In the case where the destination data exists in business card supervision table 32 (step 7; Yes), the operation proceeds to step 5.

When the retrieval of the destination data is completed, operation unit 20 displays the message as shown in FIG. 6(C) inquiring whether the destination data is to be transmitted to navigation apparatus 50 (step 8: DOES DESTINATION DATA TRANSMIT TO NAVIGATION APPARATUS?). If the user confirms the transmission, that is, selects 'YES' on the screen (step 8; Yes), operation unit 20 feeds the destination data to transmission unit 28 to transmit to navigation apparatus 50 (step 9).

Next, operation unit 20 displays the message on display screen 12 inquiring whether another destination is to be presented (step 10: DO OTHER DESTINATIONS EXIST?). If other destinations exist (step 10; Yes), the operation proceeds to step 3 and operation unit 20 retrieves the destination data of the other company. For example, when the user designates 'TOKYO HEAD OFFICE' shown in FIG. 6(A), operation unit 20 retrieves the destination of the Tokyo head office. If other destinations do not exist (step 10; No), the operation is complete.

In the case where a plurality of destinations are transmitted, navigation apparatus 50 sets up each destination and establishes routes to the destinations, and guides the driver along each route.

If the destination data does not exist (step 7; No), operation unit 20 displays an image on display screen 12 that the destination data does not exist and displays a message that requires the destination to be input by the user (step 12).

Next, operation unit 20 supervises whether an address or a telephone number as the destination data is input through input unit 26 in a predetermined period (step 13: DOES USER INPUT DATA?). If the data is input (step 13; Yes), the operation transfers to step 4 and repeats the steps 4 through 7, the input date being retrieved as the destination data.

If the user does not input data as the destination data (step 13; No), operation unit 20 displays an image warning that the data has not been input (step 14). The operation proceeds to step 10.

In the case where the user does not confirm the transmission of the destination data (step 8; No), operation unit 20 transmits the destination data stored in destination data store area 35 to navigation apparatus 50 after the user confirms the transmission of the destination data. The destination data may be sent (step 9) immediately after the retrieval without carrying out the operation of step 8.

Figure 8:
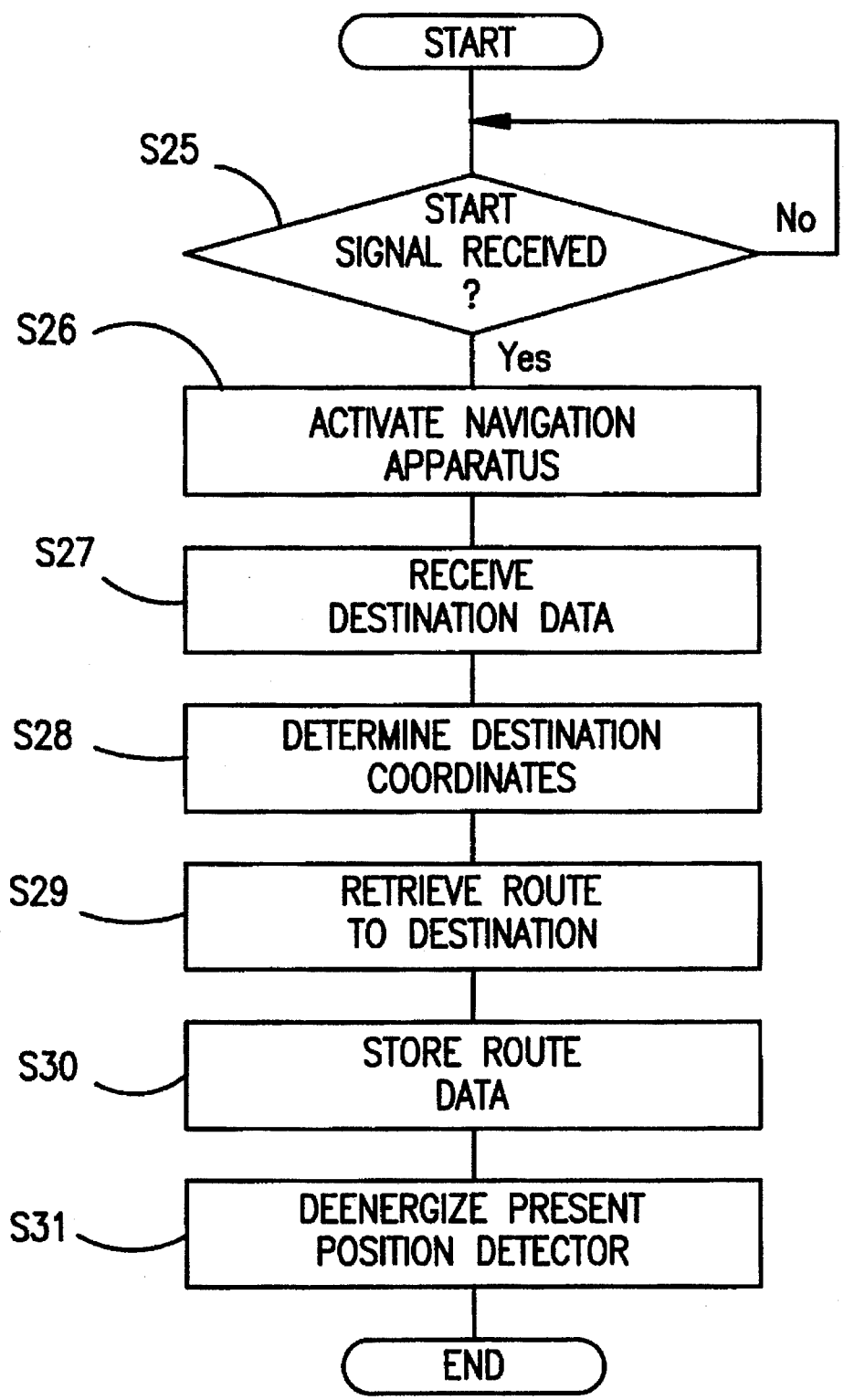
FIG. 8 is a flow sheet showing a setting-up process and a route searching process of the navigation apparatus.

FIG. 8 shows a flow sheet of a previous operation from the setting-up of the destination to the retrieval of the route for navigation apparatus 50.

In navigation apparatus 50, CPU 60 supervises whether communication unit 55 receives the starting signal from electronic diary 10 (step 25: IS STARTING SIGNAL RECEIVED?). It should be noted that this supervision program is always initiated, before a route-searching program is carried out and while the present position detection unit 53 and image display unit 56 are not energized.

When CPU 69 detects the starting signal (step 25; Yes), CPU 60 energizes the entire navigation apparatus 50 (step 26), and receives the destination data from electronic diary 10 (step 27).

When CPU 60 receives the destination data, CPU 60 retrieves the co-ordinates of the destination specified in the destination data from the road information stored in memory unit 57, to store the co-ordinates in the predetermined area in RAM 59 (step 28).

The present position detection apparatus 53 feeds the data detected by the sensors and the GPS receiver to CPU 60 when navigation apparatus 50 is energized. CPU 60 specifies the present position of the motor vehicle based on the fed data and retrieves the course to the destination corresponding to the destination data stored in RAM 58 (step 29). The retrieved route data is stored in a predetermined area in RAM 58 (step 30), present position detection unit 53 or the like are de-energized (step 31), and the operation is complete.

Figure 9:
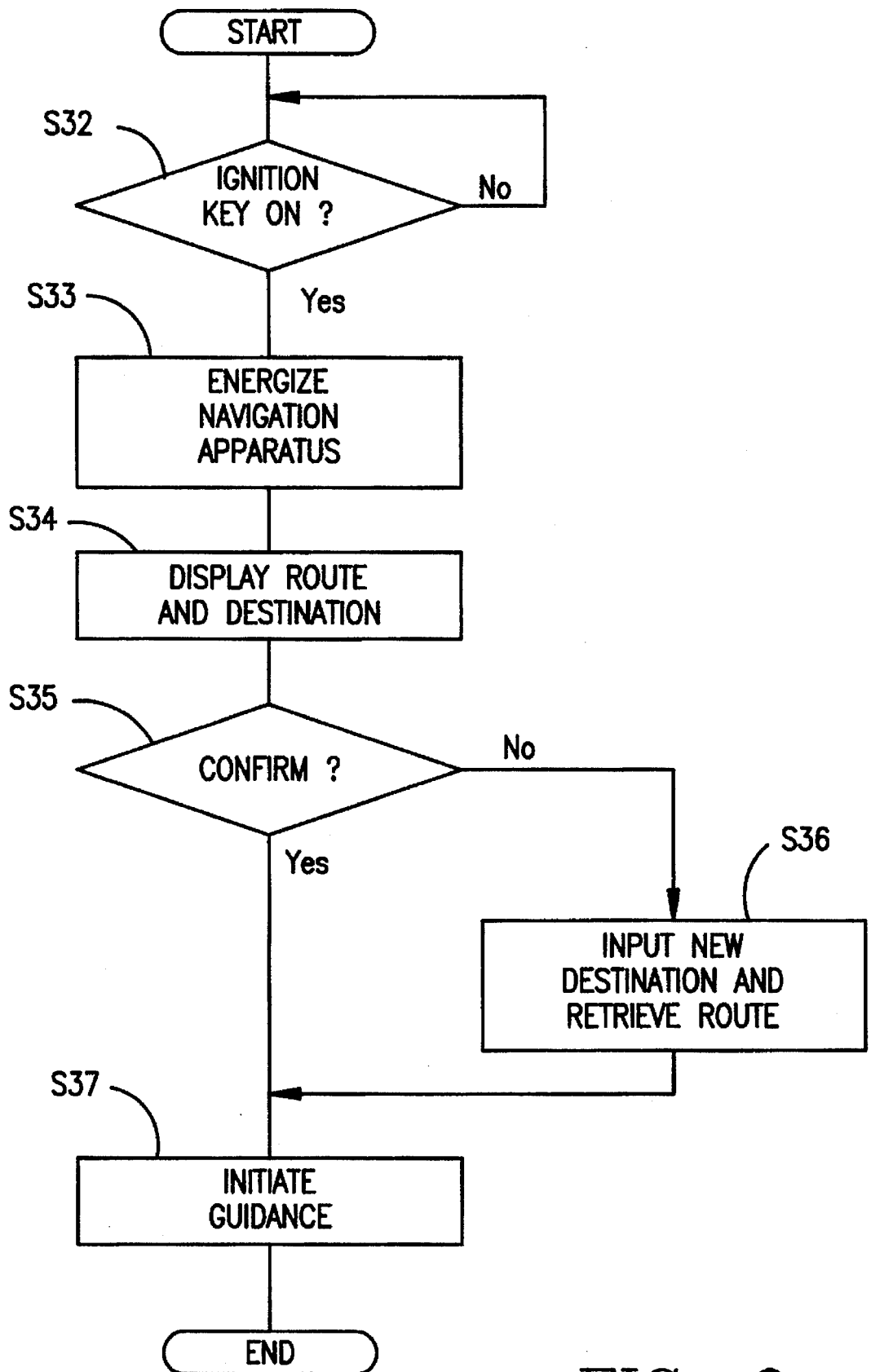
FIG. 9 is a flow sheet showing operational processes of the navigation apparatus after a user gets into a motor vehicle.

FIG. 9 shows the operation of navigation apparatus 50 after the user gets in the motor vehicle.

CPU 60 supervises whether the ignition key is turned on (step 32: IS IGNITION KEY ON?) after the completion of the above-mentioned previous operations (steps 25–31). When the user gets in the motor vehicle to turn on the ignition key (step 32; Yes), CPU 60 again energizes the entire navigation apparatus 50 (step 33).

The navigation apparatus 50 displays the destination and the route based on the destination data and the route data in the predetermined area of RAM 58 stored in the above previous operation (step 34), and requires confirmation by the user (step 35: ARE DESTINATION AND COURSE CONFIRMED?).

In the case where the destination is modified (step 35: No), the new destination is input to navigation apparatus 50 through input unit 62 again, and a destination modify operation is carried out, i.e. the course is retrieved again (step 36). The new destination may be input through electronic diary 10. A destination not included in the schedule, i.e. data concerning a company to be visited which is not stored in schedule supervision table 33, can be retrieved in each supervision table 30–32 to transmit to navigation apparatus 50. For example, if on the way to visiting the company 'Anjou-City branch office', the user must change the destination for any reason, he inputs the new destination to electronic diary 10 with input pen 18. The electronic diary 10 thus retrieves the new destination from each supervision table 30–32 to transmit to navigation apparatus 50.

When the confirmation of the destination is obtained (step 34; Yes), or the above operation for modification of the destination (step 36) is completed, navigation apparatus 50 selects the route for the automobile based on the stored route data and the present position data detected by present position detection unit 35, and initiates guidance of the route (step 37). That is, navigation apparatus 50 displays the guidance information consisting of the map, of which the size or scale may be selected by the user, together with an arrow indicating the direction of travel and the retrieved route. Further, navigation apparatus 50 also provides a voice guidance which indicates the direction of travel of the motor vehicle, for example turn left at the next intersection, together with the above mentioned image on the display screen. The user can drive the motor vehicle according to the above information.

As described above, in this embodiment, the data stored in RAM 203 of electronic diary 10 can be efficiently utilized, since the navigation apparatus sets up the guidance route based on the data transmitted from electronic diary 10 which has retrieved the data from each supervision table 30–32.

Further, the input of the destination or company to be visited can be effortlessly accomplished, since electronic diary 10 transmits details of the company to be visited by selecting the item or the company in the displayed schedule. In addition, the user has the guidance information available immediately after he gets in the motor vehicle, since navigation apparatus 50 has initiated route retrieval to the destination on receipt of the destination identification.

The operation of the electronic diary in a modified embodiment will now be described.

In the above mentioned embodiment, the destination data is transmitted by selecting the destinations from the displayed schedule which has been input. In this modified embodiment, the destinations are identified when the items of the schedule are input. That is, electronic diary 10 sequentially retrieves the destination data when each item of the schedule is input by the user, and stores the destination data in destination data store area 35. The electronic diary 10 transmits the stored destination data to navigation apparatus 50 when the user commands the transmission.

In the case where the user successively moves from visiting one company to the next company without returning to his home or place of work, the previous company becomes the starting place for the next visit. Electronic diary 10 in the modified embodiment retrieves the previous company as the starting place and transmits it as the starting place data. For example, when the user moves from 'ANJOU-CITY BRANCH OFFICE' to 'TOKYO HEAD OFFICE', as shown in FIG. 6, 'ANJOU-CITY BRANCH OFFICE' becomes the starting place for 'TOKYO HEAD OFFICE'. Accordingly, electronic diary 10 retrieves the address or the telephone number of 'ANJOU-CITY BRANCH OFFICE' as the starting place data in each supervision table 30–32 to transmit to navigation apparatus 50. In this case, electronic diary 10 transmits the destination data and the starting place data together with an identifier signal which distinguishes both data.

Further, in the modified embodiment, when electronic diary 10 transmits the retrieved destination data, the diary displays the starting time for this destination.

Therefore, the user previously inputs the time required from his place of work or home to the company to be visited first, and electronic diary 10 stores the input data in each table 30, 31, 32. As will be described later, when the user selects the destination, he also inputs his present position, i.e. home or workplace. The operation unit 20 calculates the starting time based on the required time obtained by retrieving information at steps 104, 108, 109, and the scheduled time at the destination stored in schedule supervision table 33, and shows the calculated starting time on display screen 12.

Figure 10:
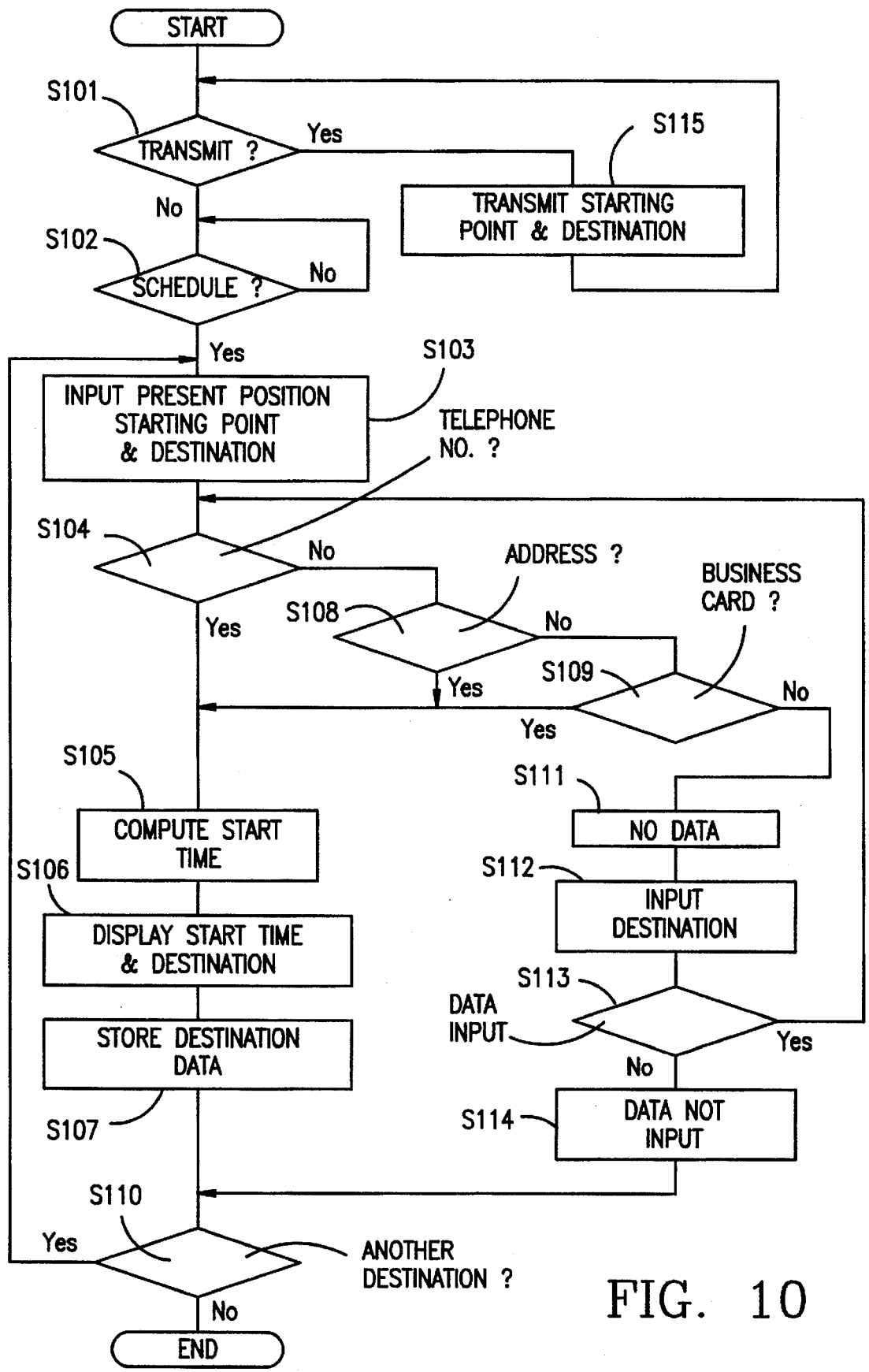
FIG. 10 is a flow sheet showing operational processes of the electronic diary in an alternative operational mode.

The operation of the modified embodiment will now be described with reference to FIG. 10. The mechanical configuration of the electronic diary is the same as the configuration shown in FIG. 3; therefore, explanation of this operation will be referred to as with FIG. 3.

The operation unit 20 determines if the transmission has been commanded (step 101: IS TRANSMISSION COMMANDED?); when the transmission is not commanded (step 101; No), operation unit 20 determines if the schedule supervision mode has been selected (step 102: IS SCHEDULE SUPERVISION MODE SELECTED?). When the schedule supervision mode is selected (step 102; Yes), the present position, the starting point and the destination under the schedule supervision mode (step 103) are input to electronic diary 10. To obtain the starting point and the destination data, operation unit 20 retrieves telephone number table 30 (step 104), address supervision table 31 (step 108) and business card supervision table 32 (step 109). The operation unit 20 calculates the starting time based on the present position, the required time included in the destination data and the data of the scheduled time to the destination stored in schedule supervision table 33 (step 105). Thereafter, operation unit 20 displays the calculated starting time on display screen 12 together with the destination data as shown in FIG. 6(B) (step 106), and stores the destination data in destination store area 35 (step 107).

Next, the operation unit 20 displays the message inquiring if another destination exists (step 110: DO OTHER DESTINATIONS EXIST?). If other destinations exist (step 110; Yes), the operation returns to step 103. If other destinations do not exist (step 111; No), the operation is complete. In the case where the destination data does not exist in the step 109 (step 109; No), the operation transfers to step 111. Each of the steps 111–114 is the same as each of the steps 11–14 of FIG. 7, therefore, the explanation thereof will be omitted.

Thereafter, the user M commands the transmission (step 101; Yes), and electronic diary 10 transmits the destination data (starting point data) to navigation apparatus 50 by means of infrared rays. That is, electronic diary 10 in the modified embodiment is designed such that the electronic diary transmits the data to navigation apparatus within the motor vehicle when the user gets in, after the destination data has been input from outside the motor vehicle. The electronic diary 10 in the modified embodiment transmits the destination and the starting point data together with identifier signals as in the described embodiment.

In the embodiments described, the destination data is transmitted to the navigation apparatus which is mounted in the motor vehicle. The navigation apparatus may be removably mounted in the motor vehicle.

In the above-described embodiments, transmission unit 28 is used as a destination data output means, the output of which can be carried out by writing the data in the IC card 14 through memory unit 22. In this case, the user removes the IC card 14 storing the destination data from the card slot 16 (refer to FIG. 1), and inserts it in a card slot (not shown) of memory unit 57 of the navigation apparatus 50. The navigation apparatus 50 thus sets up the destination based on the destination data included on IC card 14.

Although the invention has been disclosed in the context of certain preferred embodiments, it will be understood that the present invention extends beyond the specifically disclosed embodiments to other alternative embodiments of the invention. Thus it is intended that the scope of the invention should not be limited by the disclosed embodiments, but should be determined by reference to the claims that follow.

I claim:

1. An electronic diary for maintaining a schedule and for outputting to a remote vehicle navigation apparatus destination data of a desired destination wherein the navigation apparatus has means for receiving the destination data, means for determining coordinates of the desired destination and means of retrieving a route to the desired destination, said electronic diary comprising:

input means (a) for inputting schedule information including a plurality of names of destination groups and corresponding destination data which comprise at least one of an address and a telephone number and (b) for selecting one destination group from the plurality of destination groups;

schedule information storage means for storing the schedule information input by the input device;

information retrieval means responsive to the selection of the one destination group for retrieving said corresponding destination data from said storage means; and destination data output means for outputting said destination data retrieved by the information retrieval means to the navigation apparatus for use by the navigation apparatus to determine the desired destination coordinates and to retrieve the route to the desired destination.

2. An electronic diary according to claim 1, wherein said input means includes a screen and a touch-panel for inputting information displayed on the screen.

3. An electronic diary according to claim 1, wherein said destination data output means transmits the destination data to the navigation apparatus via radio waves.

4. An electronic diary according to claim 1, wherein said destination data output means transmits the destination data to the navigation apparatus via infrared rays.

5. An electronic diary according to claim 1, wherein said input means includes user command means for a user commanding transmission of the destination data to the navigation apparatus, and said destination data output means is responsive to the user command means for transmitting the destination data to the navigation apparatus when the user commands the transmission.

6. An electronic diary according to claim 1, wherein said destination data output means transmits the individual information to the navigation apparatus via an IC (integrated circuit) card.

7. An electronic diary according to claim 1, wherein said schedule information includes starting point data, and said destination data output means transmits said starting point data to the navigation apparatus together with the destination data.

8. An electronic diary for maintaining a schedule and for outputting to a remote vehicle navigation apparatus destination data of a desired destination wherein the navigation apparatus has means for receiving the destination data, means for determining coordinates of the desired destination and means of retrieving a route to the desired destination, said electronic diary comprising:

a display for displaying an information image and inputting schedule information and for selecting a desired destination group;

a control means for controlling the input from the display and information image of the display;

schedule information storage means for storing the schedule information input through the display;

said input and stored schedule information including a plurality of names of destination groups and at least one of an address and a telephone number corresponding to each of the destination groups;

information retrieval means responsive to selection of the desired destination group for retrieving said one of an address and a telephone number corresponding to the desired destination group from said schedule information storage means;

a destination output device for outputting the retrieved one of an address and a telephone number as destination data to the navigation apparatus for use in determining the coordinates as the desired destination and retrieval of a route to the desired destination.

9. An electronic diary according to claim 8, wherein said display displays that a retrieval is impossible when the information retrieval means can not retrieve the destination data corresponding to the selected destination group from said schedule information storage means.

10. An electronic diary according to claim 8, wherein a scheduled time is included in said input and stored schedule information; the diary includes second storage means for storing a time required to travel from a starting point to a destination; said control means retrieves the stored required travel time and calculates a starting time based on said scheduled time for display on said display.

11. A method for setting a destination to a navigation apparatus by an electronic diary comprising the steps of:

inputting schedule information including a plurality of names of destination groups, and at least one of an address and a telephone number corresponding to the respective destination groups;

storing the inputted schedule information including storing the plurality of names of destination groups with the corresponding at least one of an address and a telephone number;

selecting one of the plurality of names of destination groups;

retrieving said at least one of an address and a telephone number corresponding to the selected destination group; and outputting the retrieved at least one of an address and a telephone number as destination data for the navigation apparatus which sets up coordinates of the destination and retrieves a course to the destination.

12. A method according to claim 11, wherein said inputting step is carried out via a touch-panel overlying a screen.

13. A method according to claim 11, wherein said outputting step is carried out by transmitting the destination data to the navigation apparatus via radio waves.

14. A method according to claim 11, wherein said outputting step is carried out by transmitting the destination data to the navigation apparatus via infrared rays.

15. A method according to claim 11, including a user commanding step for a user commanding transmission of the destination data, and wherein said outputting step is carried out only in response to the user commanding the transmission in the user commanding step.

16. A method according to claim 11, wherein said outputting step is carried out by transmitting the destination data to the navigation apparatus via an IC card.

17. A method according to claim 11, wherein said schedule information includes starting point data, and said destination data outputting step is carried out by outputting said starting point data to the navigation apparatus together with the destination data.

* * * * *